United States Patent
Zuyi et al.

(10) Patent No.: US 8,778,450 B2
(45) Date of Patent: Jul. 15, 2014

(54) OPTICAL MEMBER AND METHOD OF MANUFACTURING THE SAME

(75) Inventors: Zhang Zuyi, Yokohama (JP); Hiroyuki Tanaka, Kawasaki (JP); Masayuki Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/010,843

(22) Filed: Jan. 21, 2011

(65) Prior Publication Data

US 2011/0117274 A1    May 19, 2011

Related U.S. Application Data

(62) Division of application No. 12/014,364, filed on Jan. 15, 2008.

(30) Foreign Application Priority Data

Jan. 22, 2007 (JP) .................... 2007-011429
Jan. 9, 2008 (JP) .................... 2008-002164

(51) Int. Cl.
*B05D 5/06* (2006.01)

(52) U.S. Cl.
USPC ............ 427/162; 427/331; 427/333; 427/337

(58) Field of Classification Search
USPC ................... 427/331, 333, 337, 162
See application file for complete search history.

(56) References Cited

U.S. PATENT DOCUMENTS

| | | | |
|---|---|---|---|
| 4,190,321 A | 2/1980 | Dorer et al. | |
| 4,252,843 A * | 2/1981 | Dorer et al. | 427/162 |
| 5,227,917 A | 7/1993 | Kubo et al. | |
| 5,250,099 A | 10/1993 | Kubo et al. | |
| 5,275,637 A | 1/1994 | Sato et al. | |
| 6,770,325 B2 * | 8/2004 | Troczynski et al. | 427/376.2 |
| 6,785,050 B2 | 8/2004 | Lines et al. | |
| 2003/0152763 A1 * | 8/2003 | Zhang et al. | 428/325 |
| 2003/0170465 A1 | 9/2003 | Krzyzak et al. | |
| 2005/0233113 A1 | 10/2005 | Kotani et al. | |
| 2005/0234137 A1 | 10/2005 | Espinoza et al. | |
| 2006/0057407 A1 | 3/2006 | Sambasivan et al. | |
| 2006/0115661 A1 * | 6/2006 | Hazel et al. | 428/469 |

(Continued)

FOREIGN PATENT DOCUMENTS

| | | |
|---|---|---|
| CN | 1438280 A | 8/2003 |
| CN | 1456523 A | 11/2003 |

(Continued)

OTHER PUBLICATIONS

May 24, 2011 Japanese Official Action in Japanese Patent Appln. No. 2008-002164 (English-language translation).

(Continued)

*Primary Examiner* — Elizabeth Burkhart
(74) *Attorney, Agent, or Firm* — Fitzpatrick, Cella, Harper & Scinto

(57) ABSTRACT

An optical member including an oxide layer that has a stable fine textured structure and is excellent in durability is provided. The optical member includes a base material and an antireflection coating on a surface of the base material. The antireflection coating includes at least an oxide layer having a fine textured structure on the surface, and the oxide layer contains a phosphate compound. Furthermore, a method of manufacturing the optical member is provided.

6 Claims, 1 Drawing Sheet

(56) References Cited

U.S. PATENT DOCUMENTS

| | | |
|---|---|---|
| 2006/0199040 A1* | 9/2006 | Yamada et al. ............... 428/701 |
| 2007/0179039 A1 | 8/2007 | El Khiati et al. |
| 2007/0247711 A1 | 10/2007 | Ohtani et al. |

FOREIGN PATENT DOCUMENTS

| | | |
|---|---|---|
| CN | 1834693 A | 9/2006 |
| EP | 1 693 689 A1 | 8/2006 |
| JP | 61-48124 B2 | 10/1986 |
| JP | 9-202649 A | 8/1997 |
| JP | 2003-231827 A | 8/2003 |
| JP | 2006-507517 A | 3/2006 |
| JP | 2006-148155 A | 6/2006 |
| JP | 2006-259711 A | 9/2006 |
| WO | 2006/028027 A1 | 3/2006 |
| WO | 2006/042116 A2 | 4/2006 |

OTHER PUBLICATIONS

Aug. 25, 2010 Appeal Brief in Japanese Patent Appln. No. 2008-002164 (English-language translation).

Apr. 28, 2008 European Search Report in European Patent Appln. No. 08000663.8.

Jan. 29, 2010 Chinese Official Action in Chinese Patent Application No. 200810005131.3.

Dec. 10, 2010 Chinese Official Action in Chinese Patent Appln. No. 200810005131.3.

* cited by examiner

US 8,778,450 B2

OPTICAL MEMBER AND METHOD OF MANUFACTURING THE SAME

This application is a division of application Ser. No. 12/014,364 filed Jan. 15, 2008.

BACKGROUND OF THE INVENTION

1. Field of the Invention

The present invention relates to an optical member and a method of manufacturing the same. More specifically, the present invention relates to an optical member having a fine textured structure of an oxide on the surface and a method of manufacturing the same.

2. Description of the Related Art

For example, eyeglass lenses, optical lenses, solar panels, cathode-ray tubes, filters, and display panels are required to be low in light scattering and reflection of the surfaces thereof. As a method of achieving this requirement, a single- or multi-layer antireflection coating that is controlled in the refractive index and thickness is used. Such a case is known that the antireflection properties of the coating change depending on the wavelength and the angle of incidence and that the realization of high-performance antireflection properties in broad ranges of the wavelength and the angle of incidence is difficult.

In addition, it is known that fine textured formed on the surface of glass can impart an antireflection function to the glass. In particular, an antireflection function over a broad range of the angle of incidence can be expected if the texture is smaller than the wavelength. As methods for fining, chemical etching or mechanical processing of glass surfaces is proposed. In the chemical etching and the mechanical processing, a fineness smaller than the wavelength of visible light is difficult. Thus, chemical etching or mechanical processing that can realize antireflection properties for an application requiring transparency in wavelength of visible light has not been developed. Furthermore, a coating film forming a textured structure on a glass surface has been investigated. For example, in Japanese Patent Publication No. 61-48124, it is disclosed that an antireflection coating formed on a transparent material such as glass by converting a metal film of aluminum, magnesium, zinc, or an alloy thereof into an oxide or a hydroxide and that the antireflection coating constitutes discrete leaflets having various heights and shapes. Japanese Patent Laid-Open No. 9-202649 discloses a transparent alumina film that is randomly agglomerated like a petal. The film is formed by applying a coating solution containing at least an aluminum alkoxide and a stabilizer onto a substrate to form an amorphous alumina film, treating the film hydrothermally, and drying it.

Many coating films as shown in Japanese Patent Publication No. 9-202649 are generally porous. In general, glasses having a high refractive index used as base materials contain oxide components such as an alkali oxide, an alkaline earth oxide, or boric oxide that are low in resistance to water and humidity. If these glasses are used as a base material for coating, water or humidity in the air penetrates to the surface of the base material, and an alkali oxide, an alkaline earth oxide, or boric oxide contained in the base material is released to cause fogging or whitening of the surface or the interface thereof. In addition, in the case of porous oxides, especially their unstable components such as a water-soluble component and a component that is dissolved and redeposited in water undergo a hydration reaction when the base material having a surface layer of porous oxides is brought into contact with moisture. Thereby, optical characteristics are deteriorated with the lapse of time. Furthermore, dissolution or corrosion of such as decomposition caused by the porous oxide itself may occur under an atmosphere containing an acid.

SUMMARY OF THE INVENTION

The present invention has been accomplished under the aforementioned circumstances and provides an optical member including an oxide layer that has a stable fine textured structure on the surface and is excellent in durability due to the stabilized fine textured structure. The present invention further provides a method of manufacturing such an optical member.

The optical member according to the present invention includes a base material and an antireflection coating on a surface of the base material. The antireflection coating includes at least an oxide layer that has a fine textured structure on the surface and contains a phosphate compound.

The method of manufacturing the optical member according to the present invention is of manufacturing an optical member having a base material and an oxide layer. The method includes forming an oxide layer on a surface of a base material, forming a fine textured structure on the surface of the oxide layer, and bringing a water-soluble phosphoric acid compound into contact with the oxide layer provided with the fine textured structure on the surface.

According to the present invention, a base material is provided with an oxide layer having a fine textured structure on the surface and, in addition, stability of the fine textured structure of the oxide layer is remarkably improved by impregnating the oxide layer with a phosphate compound. The present invention can be applied to an optical glass containing an alkali, an alkaline earth, or boron overcoming a disadvantage in durability from the glass. Thus, an optical member having broad optical characteristics can be provided.

Further features of the present invention will become apparent from the following description of exemplary embodiments with reference to the attached drawings.

DESCRIPTION OF THE EMBODIMENTS

First Embodiment

Figure 1:
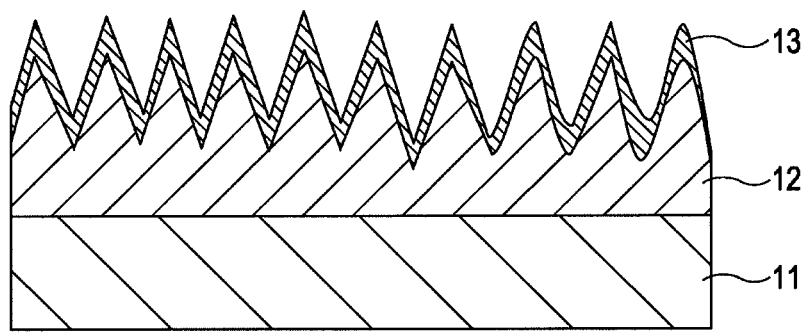
FIG. 1 is a diagram of an optical member according to a first embodiment of the present invention.

FIG. 1 shows an optical member according to a first embodiment of the present invention. The embodiment will be described below.

The optical member according to the first embodiment includes a base material 11 such as glass and an oxide layer 12 such as composite of aluminum oxide and aluminum hydroxide oxide disposed on the optical member. The oxide layer 12 has a fine textured structure on the surface and a phosphate compound-containing layer 13.

A fine textured structure of the present invention may be unevenness of the micron order or the submicron order. The fine textured structure may be a three-dimensional structure formed by solid and gaps thereamong. Oxide for solid may be in a crystalline state, an amorphous state, or a combination of the crystalline and amorphous states. The fine textured structure has a shape that can sequentially decrease refractive indices toward the surface of the oxide layer ("the surface of the oxide layer" is the surface of the optical member and the interface with the air). Accordingly, hazing and antireflection functions can be imparted to the surface of the optical member by controlling reflection properties and transmission functions of the surface by the fine textured structure. When the fine textured structure of the oxide layer has regularity, reflection and transmission functions are exhibited at a specific angle or a specific wavelength. In order to realize the antireflection function, the fine textured structure of the surface is preferably constituted by anisotropic crystalline fine particles of an oxide. The shape of the anisotropic crystalline fine particles of an oxide may be, for example, plate- or needle-like. Examples of the anisotropic crystalline fine particles of an oxide include particles of oxides such as magnesium oxide, zinc oxide, titanium oxide, and aluminum oxide; hydroxides such as boehmite (aluminum hydroxide oxide); and complex oxides such as lithium silicate and titanium silicate. Among them, plate-like particles readily form a spatially graded structure in the direction vertical to the face and are hence particularly preferred. Specifically, plate-like boehmite particles prepared by a hydrothermal reaction is preferably used. The wavelength range of light in which an antireflection function can be realized, depends on the size of crystalline fine particles of an oxide (the height of the texture) and the size of texture in the face direction. In an antireflection coating corresponding to visible light, the height of texture is preferably in the range of 0.1 to 5 µm. With a height of 0.1 µm or more, an antireflection function in the visible light range can be realized. Furthermore, with a texture height of 5 µm or less, the textured structure can maintain a high mechanical strength. The phosphate compound imparts stability to the oxide of the fine textured structure. The phosphate compound may cover at least the surface of the oxide particles and may lie in the fine textured structure.

If the phosphate compound is not present, water and humidity in the air penetrates to the surface of the base material because the oxide layer is porous. As a result, an alkali oxide, an alkaline earth oxide, or boric oxide contained in the base material is released to cause fogging of the surface or the interface thereof. In addition, some reactions may progress in the oxide layer to cause a change in the properties such as refractive index, etc. The phosphate compound of the present invention suppresses the reactivity of the unstable oxide such as amorphous oxides. With this, the change of the oxide caused by moisture in the air is inhibited. Accordingly, the release and the degradation of the oxide and disruption of the textured structure caused thereby do not occur even under an acidic atmosphere. The acid resistance and durability of the textured structure are further improved and the optical characteristics are further stabilized by also covering the surfaces of the anisotropic crystalline fine particles of an oxide constituting the textured structure with the phosphate compound.

Any phosphate compound can be used in the present invention without specific limitation as long as it is insoluble in water. Examples of the phosphate compound include magnesium phosphate, calcium phosphate, zinc phosphate, barium phosphate, aluminum phosphate, gallium phosphate, lanthanum phosphate, titanium phosphate, and zirconium phosphate. When the base material used in the optical member has a low durability, a dense region is preferably formed in the oxide layer by the phosphate compound.

Examples of the base material of the optical member according to the present invention include glasses, plastics. Typical examples of the plastic base material include films and products of thermoplastic resins such as polyester, triacetyl cellulose, cellulose acetate, polyethylene terephthalate, polypropylene, polystyrene, polycarbonate, polymethylmethacrylate, ABS resins, polyphenylene oxide, polyurethane, polyethylene, and polyvinyl chloride; and cross-linked films and cross-linked products of thermosetting resins such as unsaturated polyester resins, phenolic resins, cross-linked polyurethane, cross-linked acrylic resins, and cross-linked saturated polyester resins.

When an optical glass containing an alkali, an alkaline earth, or boron is used as the base material, an oxide layer having a fine textured structure on the surface is formed on the optical glass. The oxide layer functions as an antireflection coating having a high antireflection function. Since many glasses having a refractive index of 1.4 to 1.9 can be proposals, an optical lens having high-performance antireflection function in a broad range can be realized. The oxide layer having the fine textured structure containing the phosphate compound according to the present invention prevents the degradation caused by a component having a low water resistance. Typical examples of the optical glass base material include barium flint, barium crown, borate crown, lanthanum flint, and lanthanum crown glasses.

Second Embodiment

Figure 2:
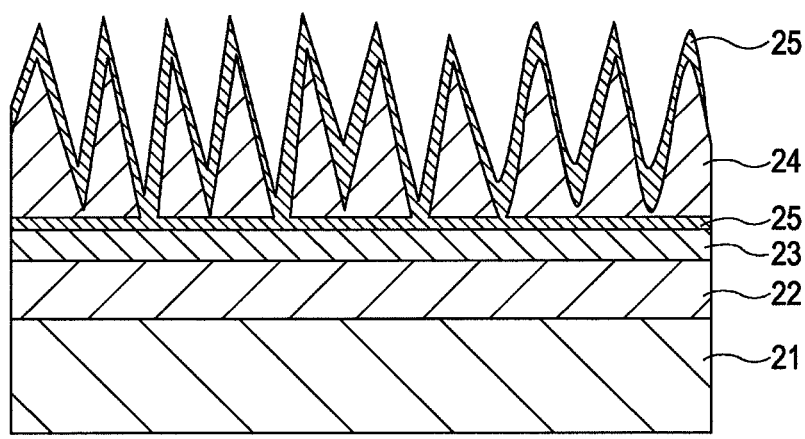
FIG. 2 is a diagram of an optical member according to a second embodiment of the present invention.

FIG. 2 shows an optical member according to a second embodiment of the present invention. The embodiment will be described below.

In this embodiment, only aspects that are different from the first embodiment will be primarily described.

The optical member according to the second embodiment includes a base material 21 such as glass and an oxide layer 24 such as aluminum hydroxide oxide. The oxide layer 24 is disposed on a surface of the optical member and has a fine textured structure on the surface. The oxide layer 24 further includes phosphate compound-containing layers 25. Furthermore, the oxide layer 24 includes an amorphous oxide layer 23 such as aluminum oxide having a thickness of 1 nm or more. The term "amorphous" in this embodiment means that diffraction due to crystallization is not observed by X-ray scattering or neutron scattering method and may be observed as a continuous film or an aggregation of particles with a particle diameter of 50 nm or less by a general observation method.

The phosphate compound covers at least the surfaces of the oxide particles and forms the phosphate compound-containing layer 23. As will be described blow, when a phosphoric acid compound penetrates gaps of the fine textured structure of the surface of the oxide layer 24, it also reacts with the amorphous oxide layer 23 to form a layer 25 of a phosphate compound on the surface of the amorphous oxide layer. A dense layer is formed by that the phosphate compound lies in the amorphous layer too. Even if the reaction with the phosphoric acid compound spreads over the entire amorphous oxide layer to change the entire amorphous oxide layer 23 into the phosphate compound-containing layer 25, the effect of the present invention can be achieved. Furthermore, the phosphate compound may lie in the fine textured structure. In addition, if necessary, an intermediate layer 22 having a refractive index different from that of the base material may be previously disposed on the surface of the base material, in order to improve the antireflection function. The intermediate layer may be formed by a known method such as vapor deposition or a sol-gel method. Examples of the intermediate layer include films of silica, titanium oxide, tin oxide, aluminum oxide, yttrium oxide, tantrum oxide, and complex films thereof. When there are relationships, $n_b \geq n_s \geq n_a$, among the refractive index $n_b$ of the base material, the refractive index $n_s$ of the intermediate layer, and the refractive index $n_a$ of the amorphous layer, the function is more effective. By controlling the refractive indices as above, the refractive indices can be gradually decreased from the base material to the amorphous oxide layer. In addition, the fine textured structure can sequentially decrease refractive indices from the amorphous layer toward the surface of the oxide layer, and thereby the antireflection effect can be significantly enhanced.

A method of manufacturing the optical member according to the present invention will now be described. The method of the present invention includes a process forming an oxide layer on a surface of a base material, a process forming a fine textured structure on the surface of the oxide layer, and a process bringing a water-soluble phosphoric acid compound into contact with the oxide layer provided with the fine textured structure on the surface.

In this embodiment, a precursor film that becomes the oxide layer is formed on a surface of the base material. Then, a fine textured structure is formed to the precursor film. The fine textured structure may be formed by any method without any limitation and can be formed by, for example, phase separation, oxidation, phase transition, crystallization, or selective elution of the precursor film. Preferably, anisotropic crystalline particles of an oxide are formed by bringing a metal film or a metal oxide film into contact with water.

In a case of a metal film, the metal film is oxidized by the contact with water to form crystalline particles of an oxide or hydroxide for forming the fine textured structure. Examples of the metal include aluminum, magnesium, and zinc. Aluminum is preferred. By using aluminum, plate-like crystalline boehmite particles having a size of several hundreds nanometers or less are formed. The metal film can be preferably formed by vapor deposition, ion plating, or sputtering.

The metal oxide film may be formed by, for example, sol-gel method, sputtering, or vapor deposition. The metal oxide film is crystallized or partially selectively etched by the contact with water to form the fine textured structure. The oxide film is preferably amorphous and is eluted and reprecipitated by the contact with water to form the fine textured structure of the crystalline fine particles. Examples of the oxide include aluminum oxide, titanium oxide, and zinc oxide. Furthermore, according to need, the oxide film may be a complex film containing such an oxide as a main component, and other oxide components such as silica, etc. which are not grown to particles alone, as solid-solution components of the particles or grain boundary components. An amorphous oxide containing aluminum oxide as a main component is preferably used as the metal oxide film forming the antireflection coating on the surface. The amorphous aluminum oxide film is converted into a fine textured structure with the growth of particles. It is preferable that an amorphous precursor film (amorphous layer) remains so as to have a thickness of 1 nm or more. As described above, since the fine textured structure can sequentially decrease refractive indices from the boundary with the amorphous layer toward the surface of the oxide layer, a hazing function and an antireflection function can be imparted to the surface of the optical member by controlling reflection properties and transmission functions of the surface of the optical member by the fine textured structure. Since the amorphous layer remains, the phosphoric acid compound reacts with the amorphous layer too to form a dense layer containing the phosphate compound and being excellent in water resistance and acid resistance.

The process of the contact with water is basically conducted under conditions suitable for the growth of particles and preferably at 50° C. or more and more preferably at 60° C. or more. The period of time for the contact process is not specifically limited and is preferably five minutes or more and three hours or less.

In the surface treatment process for bringing the obtained oxide layer provided with the fine textured structure on the surface into contact with a water-soluble phosphoric acid compound, the water-soluble phosphoric acid compound reacts at least with a part of the oxide to form a phosphate compound in the oxide layer.

Any compound having a phosphate group and being water-soluble can be basically used as the water-soluble phosphoric acid compound of the present invention. Examples of the phosphoric acid compound include phosphoric acid, polyphosphoric acid, amine phosphate, amine polyphosphate, metal dihydrogen phosphate, and metal hydrogen phosphate. These phosphoric acid compounds can be used alone or as a combination of two or more thereof. When the reactivity between the phosphoric acid compound and the oxide layer having the fine textured structure is high, the reaction with the oxide component of the fine textured structure may occur rapidly to deteriorate the fine textured structure. Accordingly, the reactivity is controlled not to damage the antireflection function of the fine texture, and metal dihydrogen phosphate or amine phosphate is preferably used. Examples of the metal dihydrogen phosphate include calcium dihydrogen phosphate, aluminum dihydrogen phosphate, zinc dihydrogen phosphate, and titanium dihydrogen phosphate. Examples of the amine phosphate include ammonium dihydrogen phosphate, diammonium hydrogen phosphate, triammonium phosphate, methylamine phosphate, ethylamine phosphate, and alkanolamine phosphate. The phosphoric acid compound reacts with the oxide layer having the fine textured structure to form a water-insoluble metal phosphate layer on the surface of the oxide component having the fine textured structure.

The water-soluble phosphoric acid compound is preferably used as an aqueous dispersion or a dispersion in a water-soluble organic solvent such as alcohol, and an aqueous dispersion is more preferred. The content of the water-soluble phosphoric acid compound is preferably 0.01% (by weight) or more and 30% (by weight) or less and more preferably 0.05% or more and 20% or less. The effect of the phosphoric acid compound in the oxide layer having the fine textured structure appears when the content is 0.01% or more. In addition, the fine textured structure is maintained and also the optical characteristics due to the fine textured structure are not damaged when the content is 30% or less.

The contact of the water-soluble phosphoric acid compound is conducted by immersing a base material provided with the oxide layer having the fine textured structure into a dispersion of the water-soluble phosphoric acid compound or a coating method such as dipping, spinning, or spraying. Furthermore, when an excessive amount of the phosphoric acid compound is applied to the oxide layer having the fine textured structure, a process for washing or rinsing out the excessive phosphoric acid compound with a dispersion solvent such as water or alcohol may be conducted.

More specifically, when the fine textured structure is a layer of anisotropic oxide particles, the phosphoric acid compound reacts with the anisotropic oxide particles to form a film of a water-insoluble phosphate compound on the particle surfaces. In a region where particles having a particle diameter of 100 nm or less are present at a high particle density, a dense phosphate compound region is formed. Furthermore, when the amorphous layer is present in the oxide layer, the phosphoric acid compound reacts with the amorphous layer too to form a dense layer containing a phosphate compound and being excellent in water resistance. In such a case, even if an optical glass containing an element selected from the group consisting of an alkali, an alkaline earth, and boron, which are low in water resistance, is used as a base material, the penetration of moisture into the glass is inhibited. Consequently, the optical member exhibiting excellent durability under a high temperature and high humidity environment can be obtained.

When it is necessary to enhance the reaction between the phosphoric acid compound and the oxide component having the fine textured structure, a process for drying at 300° C. or less may be conducted after bringing the phosphoric acid compound into contact with the oxide component.

EXAMPLES

The present invention will now be more specifically described with reference to Examples, but is not limited thereto.

Fine textured structures prepared in the following Examples and Comparative Examples were evaluated by the following methods. The cross-sections of samples were observed with a field emission scanning electron microscope (FE-SEM, Hitachi S4500) for evaluating the fine textured structures. Haze values, which are generally used as a value for indicating the degree of fogging, were measured using a haze meter (Nippon Denshoku, NDH2000) in order to evaluate the degree of fogging.

For stability of the fine textured structure, the samples were exposed to a temperature of 60° C. and a relative humidity of 90% using a circulator for the high temperature and the high humidity for continuous 1000 hours and then evaluated for the cross-sections and the degree of fogging, again. For acid resistance, samples were immersed in a 0.01 N hydrochloric acid aqueous solution, and then observed of any changes in their appearance.

Example 1

A coating solution for a sol-gel method was prepared. Aluminum-sec-butoxide [Al(O-sec-Bu)$_3$] was dissolved in 2-propanol (IPA) with stirring, and ethyl acetoacetate (Eacac) was added thereto as a stabilizer for the coating solution at a molar ratio of Al(O-sec-Bu)$_3$:IPA:Eacac=1:20:1. The resulting mixture was stirred for 30 minutes, and 0.01 N hydrochloric acid was added thereto as the source of $H_2O$ for the hydrolysis and a catalyst with a molar ratio of $H_2O$:Al(O-sec-Bu)$_3$=1:1. The obtained mixture was subjected to a reaction for 48 hours to give a coating solution of an amorphous aluminum oxide.

A phosphoric acid compound treatment solution was prepared. One part by weight of aluminum dihydrogen phosphate [Al(H$_2$PO$_4$)$_3$] was dissolved in 200 parts by weight of pure water, and the resulting solution was left to stand for about two days. The solution was filtered through a filter of 0.1 μm to give a transparent solution. This solution was used as phosphoric acid compound treatment solution 1.

Three silica glass substrates having a thickness of 1 mm were coated with the coating solution by a dipping method by immersing the substrates in the coating solution and lifting them at a speed of 3 mm/sec under a relative humidity of 50%. Then, the substrates were dried in the air for 30 minutes and subsequently heat-treated at 300° C. for 1 hour. The above procedure was repeated to conduct the coating twice to give silica glasses each provided with an amorphous aluminum oxide layer. The obtained silica glasses were treated with hot water to form fine textured of aluminum oxide. Each silica glass was put in a stainless steel holder and was immersed in pure water at 80° C. for 30 minutes and then dried at 100° C. Two of the three substrates were immersed in the phosphoric acid compound treatment solution 1 and then lifted at a speed of 3 mm/sec. The substrates were heated at 60° C. for 1 hour to give silica glasses having an oxide layer provided with the fine textured structure. One of the two silica glasses was stored in a vacuum desiccator, and the other silica glass was subjected to a durability test under the above-mentioned durability test conditions (a temperature of 60° C., a relative humidity of 90%).

The sample subjected to the durability and the sample stored in the vacuum desiccator were evaluated using a spectrophotometer. It was confirmed that both samples had a transmittance of 99.6% at 500 nm and no change in appearance occurred. Furthermore, the surfaces of both samples were observed for the fine textured structure, and it was confirmed that each sample had an amorphous layer with a thickness of 70 nm and a layer of a textured structure composed of plate-like particles with a thickness of about 350 nm on the surface. The sample was not changed under high temperature and humidity conditions compared to the sample stored in the vacuum desiccator. For acid resistance evaluation, this sample was immersed in a 0.01 N hydrochloric acid aqueous solution for 15 minutes and then rinsed with distilled water and dried at 80° C. The sample was confirmed that no changes in the appearance and in the transmittance were caused by the immersion in hydrochloric acid.

Comparative Example 1

The sample that was not coated with aluminum dihydrogen phosphate in Example 1 was subjected to the durability test as in Example 1. The appearance was similar to that of the sample stored in vacuum in Example 1, but the observation of the cross section with an electron microscope confirmed that the amorphous layer had a thickness of 50 nm. Thus, the sample was unstable and the reaction of the amorphous layer occurred under a high temperature and high humidity condition, different from the sample coated with aluminum dihydrogen phosphate. This sample was further immersed in a 0.01 N hydrochloric acid aqueous solution as in Example 1 and then evaluated for acid resistance. It was found that the aluminum oxide film on the surface completely disappeared. Thus, the sample not coated with aluminum dihydrogen phosphate did not have acid resistance.

Example 2

Two soda-lime-silica glasses (Na$_2$O: 17 wt %) having a thickness of 1 mm were coated with the amorphous aluminum oxide coating solution of Example 1 by a dipping method at a lifting speed of 3 mm/sec under a relative humidity of 50%. Then, the glasses were dried in the air for 30 minutes and subsequently heat-treated at 300° C. for 1 hour. The above procedure was repeated to conduct the coating twice to give glass substrates each provided with an amorphous aluminum oxide layer. The obtained glass substrates were treated with hot water to form a fine texture of aluminum oxide. Each glass substrate was put in a stainless steel holder and was immersed in pure water at 80° C. for 30 minutes and then dried at 100° C. One of the two glass substrates was immersed in the phosphoric acid compound treatment solution 1 and then lifted at a speed of 3 mm/sec. The glass substrate was heated at 60° C. for 1 hour to give glass 2.

The glass 2 was subjected to a durability test under the above-mentioned durability test conditions (a temperature of 60° C., a relative humidity of 90%), and it was confirmed that no change in the appearance occurred during the durability test. The transmittance measured with a spectrophotometer was 99.7%, and the haze value measured with a haze meter (Nippon Denshoku, NDH2000) was 0.12. These values were not changed compared with those before the durability test. Furthermore, the cross section of the sample was observed with an electron microscope, and it was found that the sample had an amorphous layer with a thickness of 30 nm and a layer having a textured structure composed of plate-like particles with a thickness of about 320 nm. It was also confirmed that these measurement values were not different from those before the durability test.

Comparative Example 2

The glass provided with a fine textured structure but not coated with aluminum dihydrogen phosphate in Example 2 and an untreated soda-lime-silica glass were subjected to the durability test. Both glasses had cloudiness. The haze values of the above glasses measured with a haze meter were 2 and 2.5, respectively.

Example 3

A phosphoric acid compound treatment solution was prepared. One part by weight of ammonium phosphate [$(NH_4)_3PO_4$] was dissolved in 200 parts by weight of pure water, and the resulting solution was left to stand for about two days. The obtained transparent solution was used as phosphoric acid compound treatment solution 2.

Two optical glasses containing 11% of $Na_2O$ and having a refractive index of 1.81 were used as the base material and provided with a vapor deposition film of aluminum using a tungsten heater in a vacuum. The obtained glass substrates were each put into a stainless steel holder and immersed in boiling water for 1 hour and then heated at 100° C. for 1 hour. One of two glass substrates was immersed in the phosphoric acid compound treatment solution 2 and then lifted at a speed of 3 mm/sec. The glass substrate was heated at 60° C. for 1 hour to give glass 3.

The glass 3 was subjected to a durability test under the above-mentioned durability test conditions (a temperature of 60° C., a relative humidity of 90%). It was confirmed that no change in the appearance occurred during the durability test. The transmittance measured with a spectrophotometer was 98.4%, and the haze value measured with a haze meter was 0.11, which were similar to those before the durability test. Furthermore, the cross section of the sample was observed with an electron microscope, it was found that the sample had a layer having a textured structure composed of plate-like particles with a thickness of about 155 nm. These measurement values were found to be similar to those before the durability test.

Comparative Example 3

The glass substrate that was not treated with ammonium phosphate in Example 3 was subjected to the durability test. It was found that the glass substrate became opaque and that the haze value measured with a haze meter increased to 1.2.

Example 4

Two optical borosilicate glasses ($Na_2O$: 9 wt %, $K_2O$: 9 wt %) having a thickness of 1 mm and refractive index of 1.58 were coated with the amorphous aluminum oxide coating solution of Example 1 by a dipping method at a lifting speed of 3 mm/sec under a relative humidity of 50%. Then, the glasses were dried in the air for 30 minutes and subsequently heat-treated at 300° C. for 1 hour. The above procedure was repeated to conduct the coating twice to give glass substrates each provided with an amorphous aluminum oxide layer. The obtained glass substrates were treated with hot water to form a fine texture of aluminum oxide. Each glass substrate was put in a stainless steel holder and was immersed in pure water at 80° C. for 30 minutes and then dried at 100° C. One of two glass substrates was immersed in the phosphoric acid compound treatment solution 1 and then lifted at a speed of 3 mm/sec. The glass substrate was heated at 60° C. for 1 hour to give glass 4.

The glass 4 was subjected to a durability test under the above-mentioned durability test conditions (a temperature of 60° C., a relative humidity of 90%). It was confirmed that no change in the appearance occurred during the durability test. The transmittance measured with a spectrophotometer was 99.6%, and the haze value measured with a haze meter was 0.09, and these values were similar to those before the durability test. Furthermore, the cross section of the sample was observed with an electron microscope, it was found that the sample had an amorphous layer with a thickness of 27 nm and a layer having a textured structure composed of plate-like particles with a thickness of about 370 nm. Thus, it was confirmed that these measurement values were similar to those before the durability test.

Example 5

A phosphoric acid compound treatment solution was prepared. One part by weight of calcium dihydrogen phosphate [$Ca(H_2PO_4)_2H_2O$] was dissolved in 100 parts by weight of pure water, and the resulting solution was left to stand for about two days. The obtained transparent solution was used as phosphoric acid compound treatment solution 3.

A soda-lime-silica glass ($Na_2O$: 17 wt %) having a thickness of 1 mm was coated with the amorphous aluminum oxide coating solution of Example 1 by a dipping method at a lifting speed of 3 mm/sec under a relative humidity of 50%. Then, the glass was dried in the air for 30 minutes and subsequently heat-treated at 300° C. for 1 hour. The above procedure was repeated to conduct the coating twice to give a glass substrate provided with an amorphous aluminum oxide layer. The obtained glass substrate was treated with hot water to form a fine texture of aluminum oxide. The glass substrate was put in a stainless steel holder and was immersed in pure water at 80° C. for 30 minutes and then dried at 100° C. The glass substrate was immersed in the phosphoric acid compound treatment solution 3 and then lifted at a speed of 3 mm/sec. The glass substrate was heated at 60° C. for 1 hour to give glass 5.

The glass 5 was subjected to a durability test under the above-mentioned durability test conditions (a temperature of 60° C., a relative humidity of 90%), and was confirmed that no change in the appearance occurred during the durability test. The transmittance measured with a spectrophotometer was 98.2%, and the haze value measured with a haze meter was 0.10. Furthermore, the cross section of the sample was observed with an electron microscope, and it was found that the sample had an amorphous layer with a thickness of 15 nm and a layer having a textured structure composed of plate-like particles with a thickness of about 390 nm. This phosphoric acid compound treatment compound contains calcium, which is an alkaline earth metal. However, the conformation is different from that of alkaline earth metals contained in a base material. When a substrate having an aluminum oxide layer is immersed in the phosphoric acid compound treatment solution, the phosphoric acid compound reacts with the aluminum oxide component to form a water-insoluble composite layer containing calcium phosphate and aluminum phosphate. This layer prevents moisture from penetrating into the glass base material. In addition, since calcium itself is tightly bound in a form of a salt of phosphoric acid, a change in optical properties, which is caused by migration of calcium atoms in the aluminum oxide layer, does not occur.

Example 6

A 0.5% zinc dihydrogen phosphate [$Zn(H_2PO_4)_2$] aqueous solution (treatment solution 4) was used as the phosphoric acid compound treatment solution. The 0.5% zinc dihydrogen phosphate [$Zn(H_2PO_4)_2$] aqueous solution (treatment solution 4) was prepared. One part by weight of zinc dihydrogen phosphate [$Zn(H_2PO_4)_2$] was dissolved in 200 parts by weight of pure water.

A soda-lime-silica glass ($Na_2O$: 17 wt %) having a thickness of 1 mm was coated with the amorphous aluminum oxide coating solution of Example 1 by a dipping method at a lifting speed of 3 mm/sec under a relative humidity of 50%. Then, the glass was dried in the air for 30 minutes and subsequently heat-treated at 300° C. for 1 hour. The above procedure was repeated to conduct the coating twice to give a glass substrate provided with an amorphous aluminum oxide layer. The obtained glass substrate was treated with hot water to form a fine texture of aluminum oxide. The glass substrate was put in a stainless steel holder and was immersed in pure water at 80° C. for 30 minutes and then dried at 100° C. The glass substrate was immersed in the phosphoric acid compound treatment solution 4 and then lifted at a speed of 3 mm/sec. The glass substrate was heated at 60° C. for 1 hour to give glass 6.

The glass 6 was subjected to a durability test under the above-mentioned durability test conditions (a temperature of 60° C., a relative humidity of 90%), and was confirmed that no change in the appearance occurred during the durability test. The transmittance measured with a spectrophotometer was 98.5%, and the haze value measured with a haze meter was 0.11. Furthermore, the cross section of the sample was observed with an electron microscope, it was found that the sample had an amorphous layer with a thickness of 35 nm and a layer having a textured structure composed of plate-like particles with a thickness of about 400 nm.

Example 7

An optical glass having a thickness of 1 mm, containing 11 wt % $Na_2O$, and having a refractive index of 1.81 was used as the base material.

Tetraethoxysilane (TEOS) was dissolved in ethanol (EtOH), and a 0.01 M HCl aqueous solution was added thereto as a catalyst at a molar ratio of TEOS:EtOH:HCl (aq)=1:40:2. The resulting mixture was stirred for six hours. Separately, titanium n-butoxide (TBOT) was dissolved in ethanol, and ethyl acetoacetate was added thereto as a stabilizing component at a molar ratio of TBOT:EtOH:EAcAc=1:20:1. The resulting mixture was stirred at room temperature for three hours. This $TiO_2$ sol solution was added to the above $SiO_2$ sol solution at a molar ratio of $SiO_2$:$TiO_2$=70:30. The resulting mixture was stirred at room temperature for 2 hours to give a coating solution for a $SiO_2$—$TiO_2$ intermediate film.

A coating film was formed on a surface of the glass substrate by a dipping method by immersing the glass substrate in the coating solution for an intermediate film and lifting it at a speed of 2 mm/sec under a relative humidity of 50%. After drying, the glass substrate was heat-treated at 300° C. for 1 hour, and a glass substrate coated with a transparent amorphous intermediate oxide film including titanium and silicon was obtained.

The glass substrate provided with the intermediate film was coated with an amorphous aluminum oxide coating solution of Example 1 by a dipping method at a lifting speed of 3 mm/sec under a relative humidity of 50%. Then, the glass substrate was dried in the air for 30 minutes and subsequently heat-treated at 300° C. for 1 hour. The above procedure was repeated to conduct the coating twice to give a glass substrate provided with an amorphous aluminum oxide layer. The obtained glass substrate was treated with hot water to form a fine texture of boehmite on aluminum oxide. The glass substrate was put in a stainless steel holder and was immersed in pure water at 80° C. for 30 minutes and then dried at 100° C. The glass substrate was immersed in the phosphoric acid compound treatment solution 1 of Example 1 and then lifted at a speed of 3 mm/sec. The glass substrate was heated at 60° C. for 1 hour to give glass 7.

The glass 7 was subjected to a durability test under the above-mentioned durability test conditions (a temperature of 60° C., a relative humidity of 90%). It was confirmed that no change in the appearance occurred during the durability test. The transmittance measured with a spectrophotometer was 99.5%, and the haze value measured with a haze meter was 0.11.

Example 8

An optical glass containing 30 wt % of $B_2O_3$ and having a refractive index of 1.77 was used as the base material.

The $TiO_2$ sol solution was added to the $SiO_2$ sol solution of Example 7 at a molar ratio of $SiO_2$:$TiO_2$=80:20. The resulting mixture was stirred at room temperature for 2 hours to give a coating solution for a $SiO_2$—$TiO_2$ intermediate film. A coating film was formed using this coating solution for an intermediate film on a surface of the glass substrate by a dipping method at a lifting speed of 2 mm/sec under a relative humidity of 60%. After drying at room temperature, the glass substrate was heated at 300° C. for 1 hour to give a glass substrate provided with a transparent amorphous $SiO_2$—$TiO_2$ film.

The glass substrate provided with the intermediate film was coated with an amorphous aluminum oxide coating solution of Example 1 by a dipping method at a lifting speed of 3 mm/sec under a relative humidity of 50%. Then, the glass substrate was dried in the air for 30 minutes and subsequently heat-treated at 300° C. for 1 hour. The above procedure was repeated to conduct the coating twice to give a glass substrate provided with an amorphous aluminum oxide layer. The obtained glass substrate was treated with hot water to form a fine texture of aluminum oxide. The glass substrate was put in a stainless steel holder and was immersed in pure water at 80° C. for 30 minutes and then dried at 100° C. The glass substrate was immersed in the phosphoric acid compound treatment solution 1 and then lifted at a speed of 3 mm/sec. The glass substrate was heated at 60° C. for 1 hour to give glass 8.

The glass 8 was subjected to a durability test under the above-mentioned durability test conditions (a temperature of 60° C., a relative humidity of 90%). It was confirmed that no change in the appearance occurred during the durability test. The transmittance measured with a spectrophotometer was 99.4%, and the haze value measured with a haze meter was 0.09.

Example 9

An optical glass containing 7 wt % of $Na_2O$ and having a refractive index of 1.65 was used as the base material.

The TiO$_2$ sol solution was added to the SiO$_2$ sol solution of Example 7 at a molar ratio of SiO$_2$:TiO$_2$=80:20. The resulting mixture was stirred at room temperature for 2 hours to give a coating solution for a SiO$_2$—TiO$_2$ intermediate film. A coating film was formed on a surface of the glass substrate using this coating solution for an intermediate film by a dipping method at a lifting speed of 1.5 mm/sec under a relative humidity of 60%. After drying at room temperature, the glass substrate was heated at 300° C. for 1 hour to give a glass substrate provided with a transparent amorphous SiO$_2$—TiO$_2$ film.

The glass substrate provided with the intermediate film was coated with an amorphous aluminum oxide coating solution of Example 1 by a dipping method at a lifting speed of 3 mm/sec under a relative humidity of 50%. Then, the glass substrate was dried in the air for 30 minutes and subsequently heat-treated at 300° C. for 1 hour. The above procedure was repeated to conduct the coating twice to give a glass substrate provided with an amorphous aluminum oxide layer. The obtained glass substrate was treated with hot water to form a fine texture of aluminum oxide. The glass substrate was put in a stainless steel holder and was immersed in pure water at 80° C. for 30 minutes and then dried at 100° C. The glass substrate was immersed in the phosphoric acid compound treatment solution 1 and then lifted at a speed of 3 mm/sec. The glass substrate was heated at 60° C. for 1 hour to give glass 9.

The glass 9 was subjected to a durability test under the above-mentioned durability test conditions (a temperature of 60° C., a relative humidity of 90%). It was confirmed that no change in the appearance occurred during the durability test. The transmittance measured with a spectrophotometer was 99.6%, and the haze value measured with a haze meter was 0.10.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-011429 filed Jan. 22, 2007 and No. 2008-002164 filed Jan. 9, 2008, which are hereby incorporated by reference herein in their entirety.

What is claimed is:

1. A method of manufacturing an optical member having (a) a base material and (b) an antireflection coating on the base material, the method comprising:
    forming a layer comprising aluminum or aluminum oxide on the base material;
    bringing the layer into contact with water to form a fine textured structure having crystalline particles of aluminum oxide in a surface of the layer; and
    bringing the layer having the fine textured structure into contact with a liquid in which a water-soluble phosphoric acid compound is dispersed in water or a water-soluble organic solvent, wherein the content of the phosphoric acid compound in the liquid is 0.01% by weight or more and 30% by weight or less, so as to form a fine textured structure containing a phosphate compound on the base material, wherein the reactivity between the phosphoric acid compound and the layer having the fine textured structure is controlled so as not to damage the antireflection function of the fine textured structure.

2. The method of manufacturing an optical member according to claim 1, wherein the water-soluble phosphoric acid compound contains metal dihydrogen phosphate as a main component.

3. The method of manufacturing the optical member according to claim 1, wherein the crystalline particles of aluminum oxide are boehmite.

4. The method of manufacturing the optical member according to claim 1, wherein an amorphous layer remains in the layer by the bringing the layer into contact with water, and
    wherein a dense layer containing a phosphate compound is formed in the amorphous layer by the bringing the layer brought into contact with water into contact with the liquid.

5. The method of manufacturing the optical member according to claim 1, wherein the layer is formed on an intermediate layer after the intermediate layer is formed on the base material.

6. The method of manufacturing the optical member according to claim 1, wherein the fine textured structure whose height is 0.1 μm or more and 5 μm or less is formed by the bringing the layer into contact with water.

* * * * *